(12) United States Patent
Smith et al.

(10) Patent No.: US 7,325,028 B1
(45) Date of Patent: Jan. 29, 2008

(54) INTELLIGENT AGENT BASED E-MAIL NOTIFICATION SYSTEM

(75) Inventors: Ronald M. Smith, Portland, OR (US); Kalla Muthuraghavan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,653

(22) Filed: Dec. 30, 1999

(51) Int. Cl.
G06F 15/16 (2006.01)
G06F 7/00 (2006.01)

(52) U.S. Cl. .......................... 709/202; 707/10; 707/102

(58) Field of Classification Search ................ 707/102, 707/501, 206, 207, 10, 9, 100; 705/41; 709/206, 709/202, 207, 201, 203; 370/385, 410, 352; 455/412, 466
See application file for complete search history.

(56) References Cited

U.S. PATENT DOCUMENTS

| 5,742,905 | A | * | 4/1998 | Pepe et al. ................... 455/461 |
| 6,157,924 | A | * | 12/2000 | Austin ......................... 707/10 |
| 6,157,954 | A | * | 12/2000 | Moon et al. ................. 709/228 |
| 6,163,809 | A | * | 12/2000 | Buckley ...................... 709/237 |
| 6,175,858 | B1 | * | 1/2001 | Bulfer et al. ................ 709/206 |
| 6,178,331 | B1 | * | 1/2001 | Holmes et al. .............. 455/412 |
| 6,317,594 | B1 | * | 11/2001 | Gossman et al. ........... 455/414 |
| 6,421,707 | B1 | * | 7/2002 | Miller et al. ................ 709/206 |
| 2002/0131561 | A1 | * | 9/2002 | Gifford et al. ............. 379/67.1 |

\* cited by examiner

*Primary Examiner*—Greta L Robinson
(74) *Attorney, Agent, or Firm*—Blakely, Sokoloff, Taylor & Zafman LLP

(57) ABSTRACT

A method and a system for delivering a notice over a network are disclosed. In one embodiment, a mechanism creates a user profile database. After new information is obtained, a user profile from the user profile database is identified in response to the new information. Next, the method identifies a delivery mechanism in response to the user profile. A notice is delivered in response to the user profile.

13 Claims, 5 Drawing Sheets

INTELLIGENT AGENT BASED E-MAIL NOTIFICATION SYSTEM

BACKGROUND OF THE INVENTION

1. Field of the Invention

The present invention relates to network communication. More specifically, the present invention relates to a notification system.

2. Description of the Related Art

With increasing popularity of using the Internet and the World Wide Web ("the Web") as instant communication mediums, a fast and secure notification system, which is typically an integral part of the communication medium, has also been increasingly in demand. The notification system is used to inform a user that newly arrived information is currently waiting for the user to process. For example, the notification system notifies a user that an e-mail ("electronic mail") is waiting for the user to read.

A typical notification system posts a notice on user's system account, such as, for example, an electronic mail box, so that the notice will be later displayed on the screen when the user logs onto a computer. One problem with this approach is that it requires the user to manually log on to a system, such as a computer, to check the notice. In other words, the user would not be notified if he or she does not log on to a system.

Another problem with a typical notification system is due to the voluminous number of e-mail notices where a user may find that it is difficult to determine which e-mail is more important. A user typically needs to read the notice before he or she can separate important e-mails from junk e-mails. Junk e-mails are typically e-mails for commercial purposes. In other words, the currently used notification system does not provide prioritized notification.

SUMMARY OF THE INVENTION

A mechanism, in one embodiment, creates a user profile database. After new information is obtained, a user profile from the user profile database is identified in response to the new information. Next, the method identifies a delivery mechanism in response to the user profile. A notice is delivered in response to the user profile.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
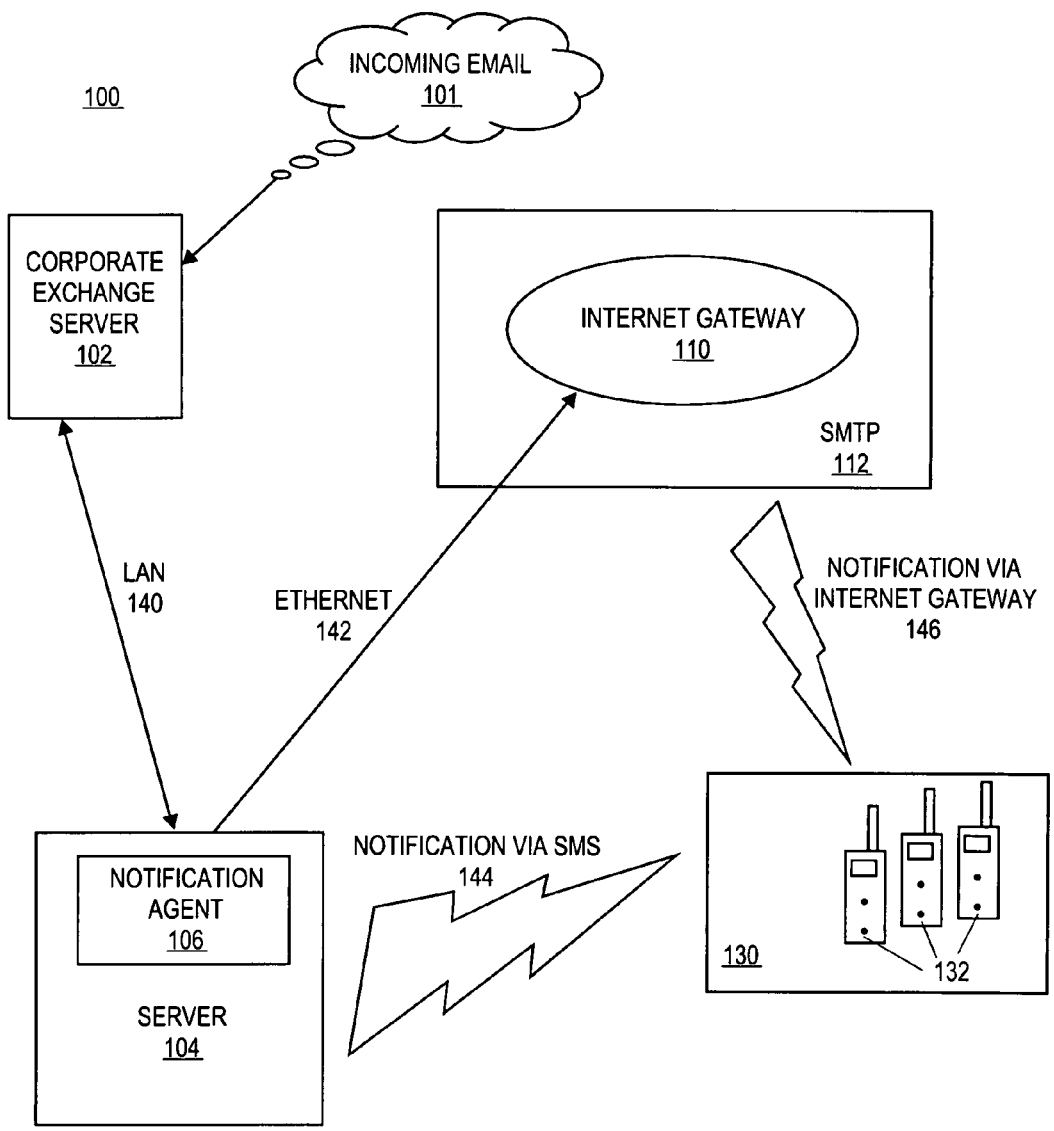
FIG. 1 is a block diagram illustrating one embodiment of a network system.

A system and a method for delivering an intelligent notice across a network, such as the Internet or a GSM ("global systems for mobiles") based SMS ("short messaging service") network, are disclosed.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, et cetera.

It should be borne in mind, however, that all of these and similar terms are to be associated with the appropriate physical quantities and are merely convenient labels applied to these quantities. Unless specifically stated otherwise, it is appreciated that throughout the present invention terms such as "processing", "computing", "calculating", "determining" or "displaying", refers to the action and process of a computer system, or similar electronic computing device, that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required steps. The required structure for a variety of these systems will appear from the description below. In addition, the present invention is not described with reference to any particular programming language. It will be appreciated that a variety of programming languages may be used to implement the teachings of the invention as described herein.

Overview

The notification system described herein includes an intelligent agent, which is capable of automatically sending an intelligent notice to a user's mobile device. The intelligent notice is initiated by newly arrived information, such as, for example, a new e-mail. In one embodiment, the user mobile device is a cellular phone. The prioritized notice or the intelligent notice, hereinafter referred to as the intelligent notice, is generated according to the user's preference, which is stored in a user profile. Moreover, the notification system may use alternative or multiple delivery vehicles to deliver intelligent notice. For example, the Global Systems for Mobiles ("GSM") Short Messaging Service ("SMS") or Simple Mail Transfer Protocol ("SMTP") may be used as the delivery vehicle to deliver a notice between devices. Accordingly, the intelligent notice can reach the recipient's or user's mobile device at all times so long as the user's mobile is reachable.

FIG. 1 is a block diagram illustrating one embodiment of a network system 100. Network system 100 contains an exchange server 102, a server 104, an Internet gateway 110, and a mobile client 130. In one embodiment, exchange server 102 is physically connected to server 104 via a local area network ("LAN") 140. Upon receipt of an incoming e-mail 101, exchange server 102 determines whether the incoming e-mail 101 is a private e-mail or a commercial e-mail. A Private e-mail is referred to herein as an electronic mail between two individual parties. A commercial e-mail is referred to as an electronic commercial advertisement. Server 104 is coupled to Internet gateway 110 via a communication channel, such as, for example, Ethernet 142. Mobile client 130 denotes a number of possible e-mail recipients, who carry small mobile devices 132, which may be logically communicably coupled to Internet gateway and server 104. In one embodiment, small mobile device 132 could be a cellular phone, a pager, or an electronic planner, etc.

In one embodiment, exchange server 102 is a network server that performs data processing and filtering. The data processing may include receiving and sending information over a network. The data filtering may include performing firewall functions. In one embodiment, the data filtering operations check whether the recipient or user is registered to use the intelligent notification services. In this embodiment, notification agent 106 includes a user profile database that contains user names, notification criteria, and delivery vehicles.

In another embodiment, server 104 contains a notification agent 106. Notification agent 106 is server software used to implement the intelligent notification system. Notification agent 106 may be integrated with other programs, such as, for example, Microsoft Outlook 98™ sold by Microsoft Corporation.

In one embodiment, a delivery vehicle, such as, for example, Global Systems for Mobiles ("GSM") Short Messaging Service ("SMS") or Simple Mail Transfer Protocol ("SMTP"), is used to deliver a notice between devices. GSM serves digital cellular phones and it uses mobile originated ("MO") SMS to notify users with GSM phones. In another embodiment, SMTP is used together with Internet gateway to deliver a notice to a user having a telephonic device. A telephonic device can be a cellular phone (digital or analog), a personal organizer, or any other small electronic devices, such as, for example, Palm-Pilot™ manufactured by 3com corporation. Other delivery vehicles may be used to deliver intelligent notices, but they are not necessary to understanding the invention.

In operation, upon receipt of the incoming e-mail 101, exchange server 102 screens the e-mail 101 and subsequently, passes the e-mail 101 to server 104 via LAN 140. After the e-mail 101 reaches server 104, notification server agent 106 compares the e-mail 101 with user profiles stored in the user profile database to determine whether the recipient of the e-mail 101 is registered to use the intelligent notification services. When a corresponding user profile is identified, which indicates that the recipient is registered to use the intelligent notification services, notification agent 106 compiles an intelligent notice according to the criteria listed in the corresponding user profile.

After the completion of the compilation of the intelligent notice, notification agent 106 identifies a delivery vehicle to deliver the intelligent notice. In one embodiment, if the recipient has a digital cellular phone, the digital cellular phone is used to notify the recipient that a new e-mail is waiting for the user to process. Ringing, vibrating, or displaying of the phonic device may be used to initiate the notification. Other delivery vehicles may be used, but they are not necessary for understanding the present invention.

Figure 2:
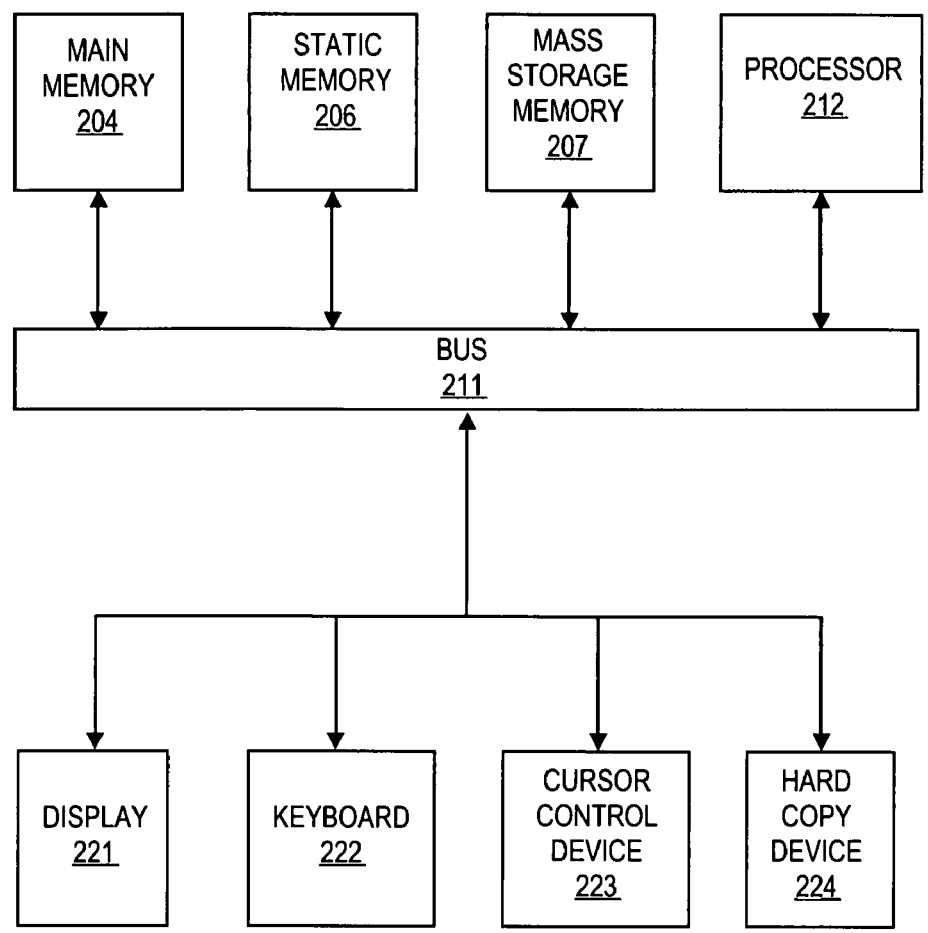
FIG. 2 illustrates one embodiment of a system that is capable of delivering an intelligent notice.

FIG. 2 illustrates one embodiment of a system 200. System 200 comprises a bus or other communication means 211 for communicating information, and a processor 212 coupled with bus 211 for processing information. Processor 212 includes a microprocessor, but is not limited to a microprocessor, such as an Intel Architecture Microprocessor, manufactured by Intel Corporation of Santa Clara, Calif., the corporate assignee of the present invention. Processor 212 may also be another processor such as the PowerPC™, Alpha™, et cetera.

System 200 further comprises a random access memory (RAM), or other dynamic storage device 204 (referred to as main memory) coupled to bus 211 for storing information and instructions to be executed by processor 212. Main memory 204 may also be used for storing temporary variables or other intermediate information during execution of instructions by processor 212. Computer system 200 also comprises a read only memory (ROM) and/or other static storage device 106 coupled to bus 211 for storing static information and instructions for processor 212, and a data storage device 207, such as a magnetic disk or optical disk and its corresponding disk drive. Data storage device 207 is coupled to bus 211 for storing information and instructions.

Computer system 100 may further be coupled to a display device 221, such as a cathode ray tube (CRT) or liquid crystal display (LCD), coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, trackball, trackpad, stylus, or cursor direction keys, coupled to bus 211 for communicating direction information and command selections to processor 212, and for controlling cursor movement on display 211.

Another device which may be coupled to bus 211 is hard copy device 224, which may be used for printing instructions, data, or other information on a medium such as paper, film, or similar types of media. Furthermore, a sound recording and playback device, such as a speaker and/or microphone may be coupled to bus 211 for audio interfacing with system 200. However, it can be appreciated that other configurations of the computer system may include some or all of the devices.

Figure 3:
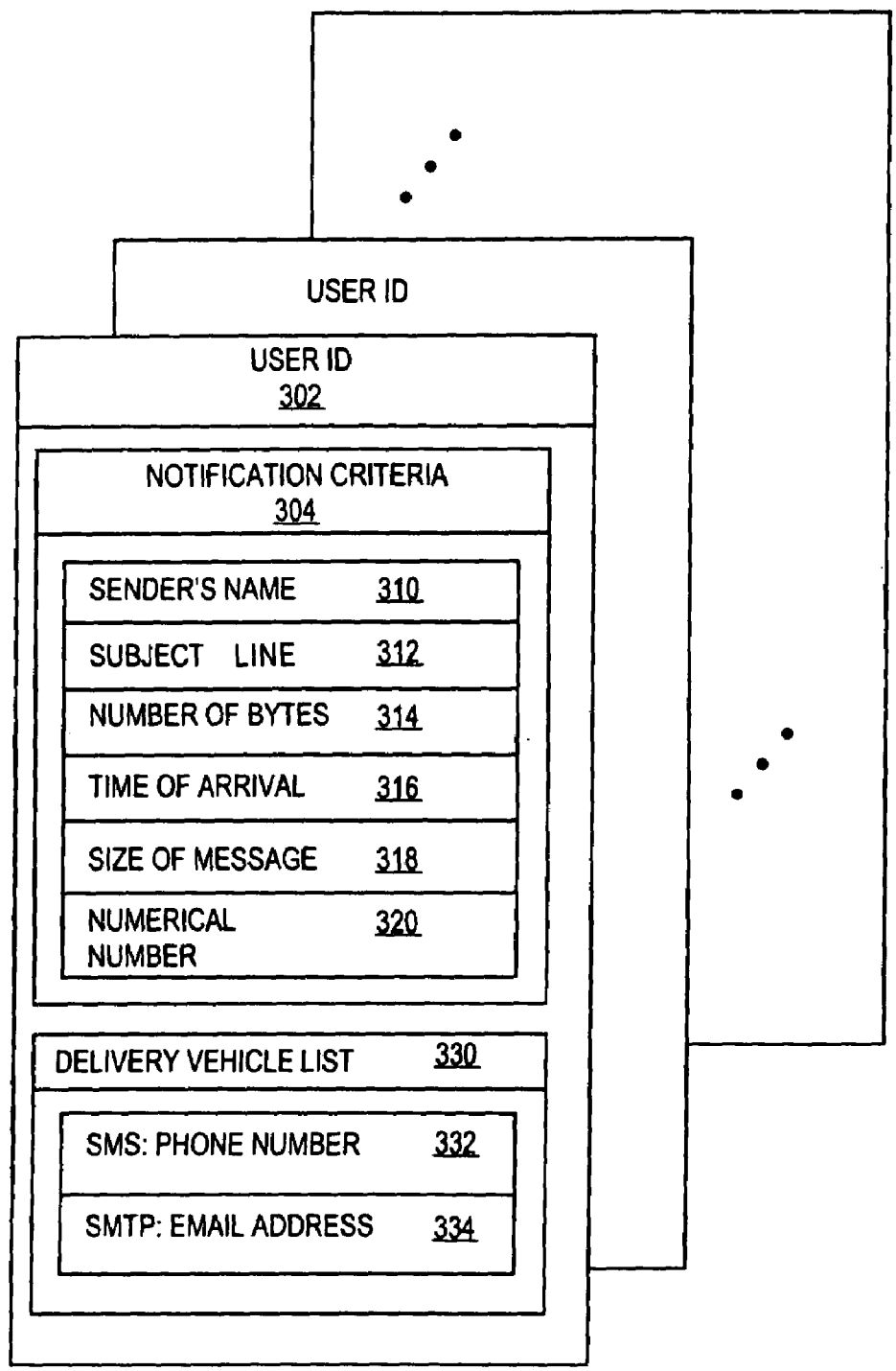
FIG. 3 illustrates one embodiment of user profile database 300, which contains multiple user profiles.

FIG. 3 illustrates one embodiment of user profile database 300, which contains multiple user profiles. In one embodiment, each user profile contains a user name 302, notification criteria 304, and a delivery vehicle list 330. The user name 302, also referred to herein as a user id, identifies the user.

In one embodiment, notification criteria 304 contains sender's name 310, subject line 312, number of bytes 314, time of arrival 316, size of message 318, and a numerical number 320. When the sender's name of the e-mail matches with the sender's name 310 listed under notification criteria 304, an intelligent notice will be compiled in response to notification criteria 304. Various other criteria may be added to the user profiles.

In one embodiment, delivery vehicle list 330 contains SMS 332 and SMPT 334. When two delivery vehicles are available for delivering the notice, notification agent 106 may choose any one of two delivery vehicles to deliver the intelligent notice according to the user profile. In this embodiment, if one of the two delivery vehicles fails to deliver the notice, the other delivery vehicle may be chosen for the next delivery of the intelligent notice. In an alternative embodiment, notification agent 106 uses all possible delivery mechanisms at the same time. In another embodiment, if no delivery option is mentioned in the user profile, a default delivery vehicle may be used.

Figure 4:
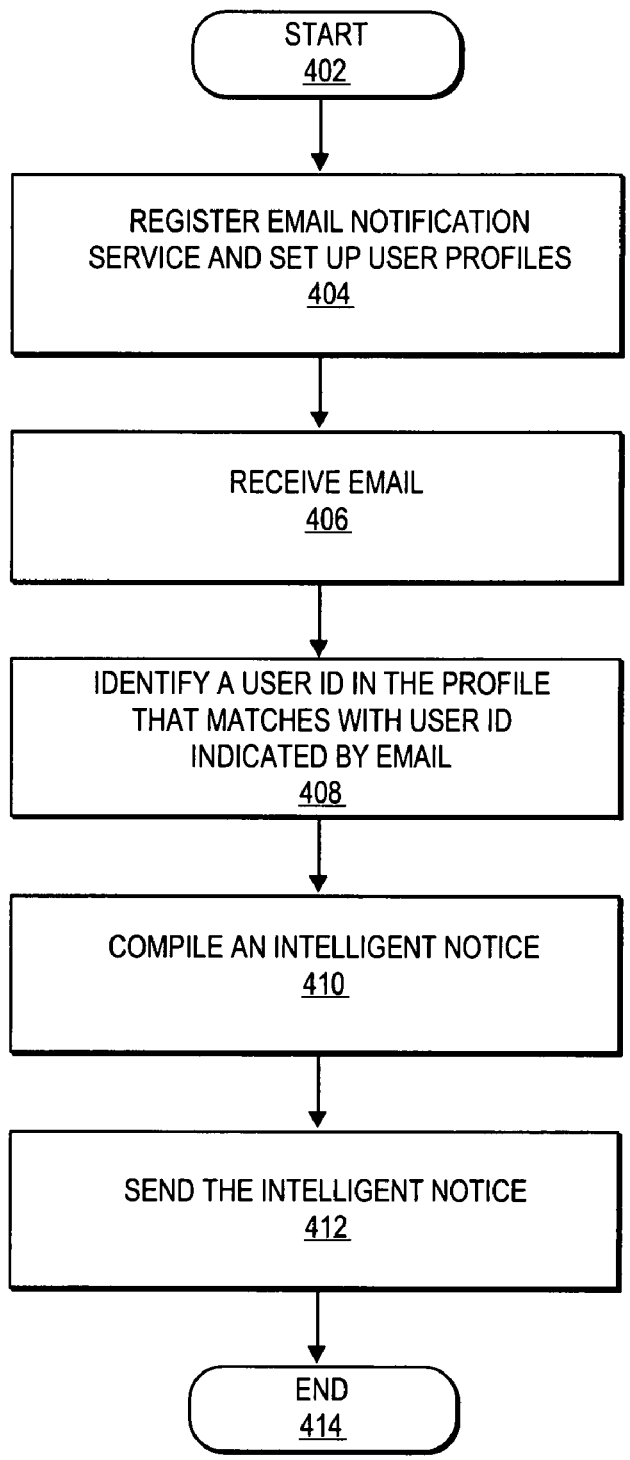
FIG. 4 is a flowchart illustrating one embodiment of a process for generating an intelligent notice.

FIG. 4 is a flowchart 400 illustrating one embodiment of a process for generating an intelligent notice. The process may be performed by processing logic, which may comprise hardware, software, or a combination of both. As shown in block 404, the process begins by processing logic receiving user registration request and criteria of notification. User profiles are subsequently set up according to user registration request and criteria of notification. Next, processing logic receives a new e-mail at block 406. Processing logic identifies a corresponding user profile in response to the new e-mail at block 408, and compiles an intelligent notice (block 410). Processing logic sends the intelligent notice (block 412) and then the process proceeds to block 414 where the process ends.

Figure 5:
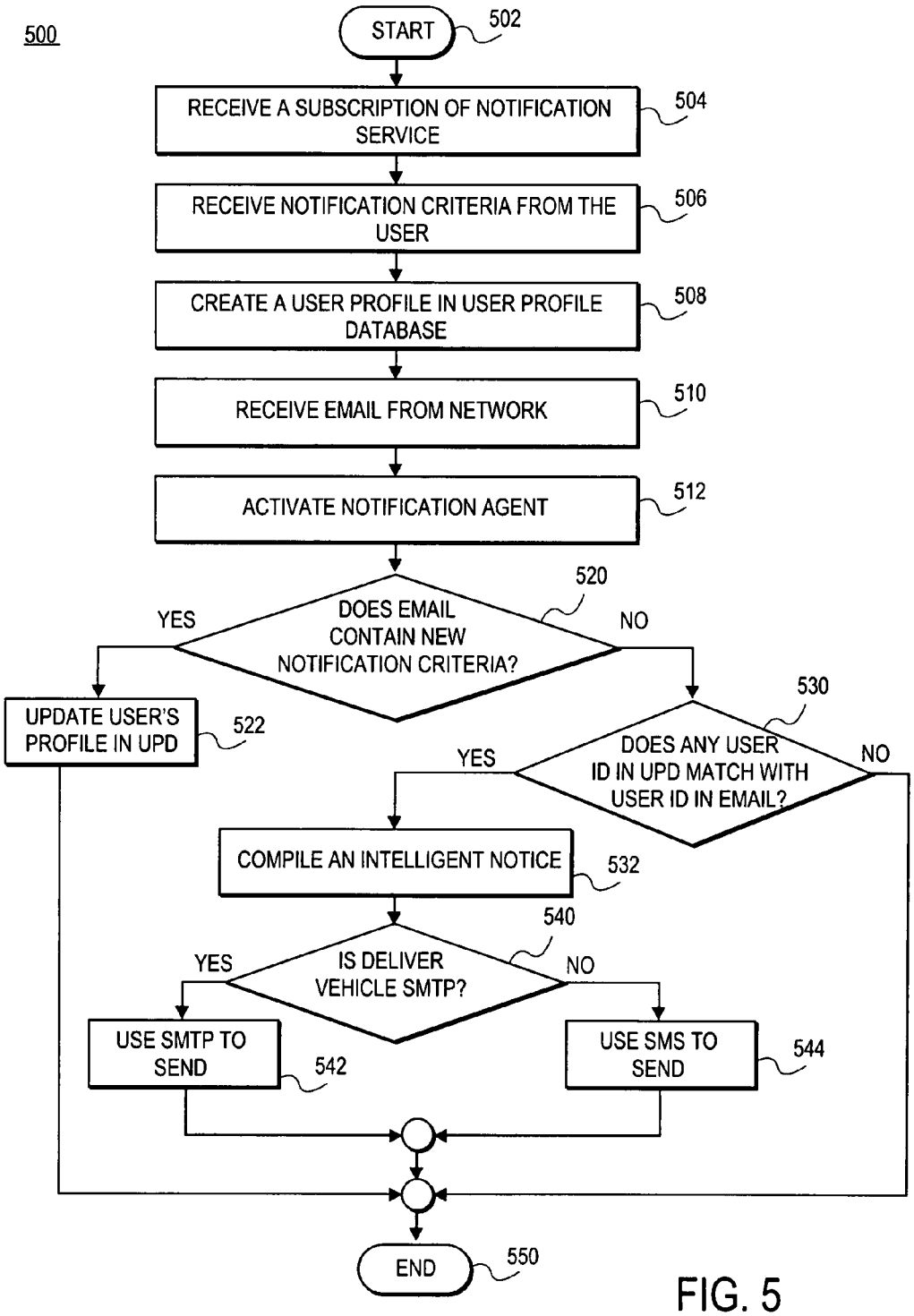
FIG. 5 is a flowchart illustrating one embodiment of a process for delivering an intelligent notice over a network.

FIG. 5 is a flowchart 500 illustrating one embodiment of delivering an intelligent notice over a network. The process begins at start block 502 and proceeds to block 504. At block 504, the process receives a service subscription for intelligent notification. After block 504, the process receives notification criteria at block 506. Upon receipt of service subscription and the criteria, a user profile is created at block 508. After block 508, the process at block 510 receives an e-mail. After receiving the e-mail, the process activates notification agent at block 512.

At block 520, the process determines whether the e-mail contains new notification criteria. If block 520 is true, which indicates that the e-mail contains new notification criteria, the process moves from block 520 to block 522. At block 522, the process updates the associated user profile in response to the new notification criteria. After block 522, process proceeds to block 550 where the process ends.

If block 520 is false, which indicates that the e-mail does not contain new notification criteria, the process proceeds from block 520 to block 530. At block 530, the process determines whether the name of e-mail recipient matches with at least one user id of a user profile. If block 530 is true, which means that one user id has matched with the name of e-mail recipient, the process moves from block 530 to block 532.

At block 532, the process customizes an intelligent notice, also known as a customized notice, in response to the user profile. At block 540, the process determines whether SMTP should be used as the delivery vehicle to deliver the intelligent notice. If block 540 is true, which indicates that the delivery vehicle is SMTP, the process proceeds from block 540 to block 542. SMTP is used to deliver the intelligent notice. After block 542, the process ends at block 550.

If block 540 is false, which indicates that the delivery vehicle is not SMTP, the process proceeds from block 540 to block 544. At block 544, SMS is selected as the delivery vehicle for sending the intelligent notice. After block 544, the process ends at block 550. On the other hand, if block 530 is false, which indicates that no user id matches with the name of e-mail recipient, the process proceeds from block 530 to block 550 where the process ends.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims, which in themselves recites only those features regarded as essential to the invention.

Thus, a method and a system for delivering an intelligent notification over a communication network has been described.

We claim:

1. A method comprising:
receiving an email, the email corresponding to a user profile, the user profile including one or more of a notification criteria, a user name, and a delivery vehicle list, wherein the notification criteria includes a sender name;
upon receiving the email, activating a notification agent to facilitate providing prioritized notification;
generating a notice corresponding to the email via the notification agent, wherein a name associated with the email matches the sender name of the notification criteria, wherein the notice is customized according to contents of the user profile and sent to a device associated with a user;
determining a delivery vehicle associated with a device from the delivery vehicle list, wherein the delivery vehicle includes one or more of Global System for Mobiles (GSM), Short Messaging Service (SMS), and Simple Mail Transfer Protocol (SMTP);
if the device uses the SMTP, sending the customized notice corresponding to the email to the device via the SMTP; and
if the device does not use the SMTP and use the GSM, sending the customized notice corresponding to the email to the device via the SMS.

2. The method of claim 1, further comprising:
receiving the user profile, the user profile further including one or more of a registration request and a customization criteria from the user; and
storing the user profile at a database.

3. The method of claim 1, wherein sending the of the customized notice is performed in a secure manner.

4. The method of claim 1, further comprising identifying a delivery mechanism to send the customized notice.

5. The method of claim 1, wherein the notification criteria further comprises one or more of a subject line, a number of bytes, a time of arrival, a size of message, and a numerical number.

6. A system comprising:
 a first server;
 a second server coupled to the first server, the second server to screen emails and send the emails to the first server; and
 a device coupled with the first server and the second server, the device to receive a customized notice from the first server, the first server having
  a storage medium to store a notification server agent and instructions to perform functions of the notification server agent via a processor,
  the processor coupled with the storage medium, the first server to receive an email from the second server, the email corresponding to a user profile, the user profile including one or more of a notification criteria, a user name, and a delivery vehicle list, wherein the notification criteria includes a sender name,
 upon receiving the email, activating a notification agent to facilitate providing prioritized notification;
 generate a notice corresponding to the email via the notification agent, wherein a name associated with the email matches the sender name of the notification criteria, wherein the notice is customized according to contents of the user profile and send to a device associated with a user,
 determine a delivery vehicle associated with a device from the delivery vehicle list, wherein the delivery vehicle includes one or more of Global System for Mobiles (GSM), Short Messaging Service (SMS), and Simple Mail Transfer Protocol (SMTP),
 if the device uses the SMTP, the first server to send the customized notice corresponding to the email to the device via the SMTP, and
 if the device does not use the SMTP and use the GSM, the first server to sending the customized notice corresponding to the email to the device via the SMS.

7. The system of claim 6, wherein the customized notice is securely delivered.

8. The system of claim 6, wherein the first server comprises a delivery mechanism to send the customized notice via the SMS.

9. The system of claim 8, wherein the delivery mechanism further to send the customized notice via the SMTP.

10. The system of claim 6, wherein the notification criteria further comprises one or more of a subject line, a number of bytes, a time of arrival, a size of message, and a numerical number.

11. An article of manufacture comprising a machine-accessible medium having instructions which when executed cause a machine to:
 in response to receiving an email, the email corresponding to a user profile, the user profile including one or more of a notification criteria, the user name, and a delivery vehicle list, wherein the notification criteria includes a sender name;
 upon receiving the email, activating a notification agent to facilitate providing prioritized notification;
 generate a notice corresponding to the email via the notification agent, wherein a name associated with the email matches the sender name of the notification criteria, wherein the notice is customized according to contents of the user profile and sent to a device associated with a user;
 determine a delivery vehicle associated with a device from the delivery vehicle list, wherein the delivery vehicle includes one or more of Global System for Mobiles (GSM), Short Messaging Service (SMS), and Simple Mail Transfer Protocol (SMTP);
 if the device uses the SMTP, send the customized notice corresponding to the email to the device via the SMTP; and
 if the device does not use the SMTP and use the GSM, send the customized notice corresponding to the email to the device via the SMS.

12. The article of manufacture of claim 11, wherein the user profile further includes one or more of a registration request and a customization criteria from the user.

13. The article of manufacture of claim 11, wherein the instructions when further executed cause the machine to send the customized notice in a secure manner.

* * * * *